United States Patent Office 3,586,521
Patented June 22, 1971

3,586,521
GLASS-CERAMIC ARTICLE AND METHOD
David A. Duke, 7 Theresa Drive,
Corning, N.Y. 14830
No Drawing. Continuation-in-part of application Ser. No. 365,202, May 5, 1964. This application Mar. 18, 1968, Ser. No. 714,014
Int. Cl. C03c 3/22
U.S. Cl. 106—39          5 Claims

ABSTRACT OF THE DISCLOSURE

This invention relates to the strengthening of glass-ceramic articles wherein the crystal content thereof constitutes the predominant portion and containing carnegieite as the principal crystal phase. The strengthening effect is realized through an ion exchange reaction occurring within a surface layer of the article wherein potassium ions from an external source are exchanged for sodium ions in the carnegieite crystals but the structural nature of the crystals is essentially unchanged, thereby causing compressive stresses to be developed in the surface layer.

---

This application is a continuation-in-part of my pending application, Ser. No. 365,202, filed May 5, 1964, now abandoned.

The production of glass-ceramic articles is dependent upon a carefully controlled crystallization of a glass article in situ. In forming such articles, a glass batch commonly containing a nucleating agent is melted, the melt simultaneously cooled to a glass and an article of a desired configuration shaped therefrom, and this glass article then subjected to a particular heat treating schedule which initiates the development of nuclei in the glass that provide sites for the growth of crystals thereon as the heat treatment is continued.

Since the crystallization comprises the substantially simultaneous growth on essentially countless nuclei, the body of a glass-ceramic article consists of relatively uniformly-sized, fine-grained crystals homogeneously dispersed in a glassy matrix with the crystals constituting the predominant portion of the article. Glass-ceramic articles are conventionally greater than 50% by weight crystalline and, often, are actually more than 80% by weight crystalline. Inasmuch as glass-ceramic articles are highly crystalline, the chemical and physical properties thereof are usually quite different from those of the parent glass and more nearly approximate the character of crystalline articles. Furthermore, the very high crystallinity of glass-ceramic articles leaves a residual glassy matrix that is very small in quantity and has a composition very different from the parent glass since the components making up the crystals will have been precipitated therefrom.

A rather complete study of the theoretical considerations and the practical aspects inherent in the production of glass-ceramic articles, along with a discussion of the crystallization mechanism involved, is incorporated in U.S. Pat. No. 2,920,971 and reference is made thereto for further explanations of these factors. As can be readily appreciated, the crystal phases developed in glass-ceramic articles are dependent upon the composition of the parent glass article and the heat treatment to which the glass is exposed.

The term "carnegieite" has been used to designate a crystal having the general formula $Na_2O \cdot Al_2O_3 \cdot 2SiO_2$ and having a defined crystal geometry. I have now found that glass-ceramic materials can be produced containing a primary crystal phase which corresponds by X-ray diffraction pattern analysis to the crystal carnegieite. In view of the crystal pattern correspondence, I have termed such glass-ceramic materials and their crystal phases carnegieite.

Normally, when glasses composed essentially of substantial amount of $Na_2O$, $Al_2O_3$ and $SiO_2$ are crystallized with the aid of nucleating agents such as $TiO_2$ and/or $ZrO_2$ to form glass-ceramic materials, the primary crystal phase that separates is a nepheline crystal phase composed of crystals which correspond to the pattern of the nepheline crystal. I have found that, in a limited composition area and in the absence of a nucleating agent, a so-called self-nucleated carnegieite crystal phase can be developed by suitable heat treatment of $Na_2O$—$Al_2O_3$—$SiO_2$ glasses.

The diffusion of ions in any medium is a direct function of the structure of the medium itself. Hence, whereas a crystal has a long range ordered structure of ions, glass has only short range order and has even been deemed to consist of a random networth of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange.

When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contempltaes the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

The modification of chemical composition and physical properties in the crystal phase of a glass-ceramic article by ion exchange is generally disclosed and claimed in an application filed May 5, 1964, Ser. No. 365,117, in the name of R. O. Voss, entitled "Glass-Ceramic Article and Method," and assigned to a common assignee, and now abandoned. This application specifically discloses that glass-ceramic materials containing a beta-spodumene crystal phase are capable of having the lithium ion of such crystal phase exchanged for a sodium ion within a surface layer on the article, and that such exchange develops compressive stresses within the surface layer to thereby greatly increase the mechanical strength of the article. The application further discloses that, while ion exchange occurs generally in glass-ceramic materials, such exchange in a surface layer on an article does not necessarily result in strengthening. Thus, it discloses that ion exchange in the metastable beta-eucryptite crystal phase, which may form preliminary to the beta-spodumene phase, does not normally lead to an increase in strength of the article.

I have found that glass-ceramic articles characterized by a carnegieite crystal phase may undergo ion exchange with an exchangeable ion of larger ionic radius, and that such ion exchange in a surface layer on an article will lead to an increase in the strength of the article. An exchangeable ion is a positively charged cation, e.g., a potassium ion, that can migrate to a finite depth in a material in exchange for another such ion under the combined activation of a chemical force (differential ion concentration) and a physical force (heat and/or electrical potential).

In the practice of my invention, a portion of the sodium ions of the carnegieite in a surface layer on the glass-ceramic article is replaced by potassium ions without substantially altering the geometric pattern of the carnegieite crystal. This chemical change in the crystal composition without a corresponding physical change in its geometry results in the development of compressive stress in the modified surface layer with consequent increase in the mechanical strength of the article. This replacement of the small diameter sodium ions with larger-diameter potassium ions is on a one-for-one basis such that the total concentration of alkali metal ions molarwise is identical before and after the ion exchange reaction. Since the exchange is undertaken in the surface of the articles, it is apparent that the concentration of potassium ions in the surface layer will be much greater than in the interior portion whereas the concentration of the sodium ions will be much greater in the interior portion than in the surface layer. These differences in the potassium and sodium ion concentrations produce the desired compressive stresses.

The structure of high-temperature carnegieite is based upon a cristobalite-type framework wherein approximately half of the silicon atoms are replaced by aluminum and electrical neutrality is maintained through the presence of sodium ions. These sodium ions occupy some of the voids in the crystal framework and are twelve-fold coordinated. The position of the sodium ions makes them capable of replacement by potassium ions to a limited extent as has been determined by studies of the $Na_2O$—$K_2O$—$SiO_2$ phase diagram.

The present invention relates generically to the strengthening by ion exchange of glass-ceramic articles containing a carnegieite crystal phase. Accordingly, it is not necessarily limited to any particular composition, or method of formation of the glass-ceramic material. It is, of course, particularly concerned with the self-nucleated family of carnegieite glass-ceramic compositions which I have discovered. In general, compositions which I have found to be capable of forming the carnegieite crystal phase are composed of 12–19% $Na_2O$, 40–51% $SiO_2$ and 37–45% $Al_2O_3$. While the self-nucleating mechanism is not fully understood, it is thought to be associated in some manner with the relatively high alumina content of this family of compositions.

By way of illustration, then, a glass is melted having a composition within the indicated ranges, and an article of desired form is produced therefrom. The article is then heat treated in accordance with a suitable schedule to convert the glass to a glass-ceramic state by development of a fine-grained, carnegieite crystal phase throughout the glass body. Essentially the heat treatment consists in heating the glass article to a temperature of about 800 to 900° C., holding at such temperature for a period of 1–4 hours, thereafter heating to a higher temperature on the order of 1000°–1200° C., and again holding for a period of 1–4 hours to permit development of the crystal phase. It will be appreciated that considerable modification of the heating schedule may be made. In particular, the initial hold of 1–4 hours may be eliminated by employing a relatively slower heating rate over a range of temperatures in this vicinity. However, the schedule proposed is generally desirable to provide a well-crystallized product with a minimum of distortion.

The glass-ceramic article thus produced is then brought into contact with a material containing an exchangeable cation of larger ionic radius than sodium, preferably potassium ion, at an elevated temperature and for a sufficient time to permit an effective degree of ion exchange, that is an exchange to a finite depth within the surface of the glass-ceramic article.

The larger exchangeable ion may be brought into intimate contact with the glass-ceramic article surface in various ways. However, it is generally convenient to employ a molten salt bath and to immerse the article in such bath for a predetermined time sufficient to provide a desired degree of ion exchange.

The rate of ion exchange increases with temperature and, for strengthening purposes, temperatures above about 700° C. are generally required to produce optimum strengthening in a reasonable length of time, that is, within 16 hours or so. However, it will be apparent that a degree of strengthening may be obtained at lower temperatures and lesser times. The ion exchange process appears to be a diffusion controlled process such that the amount of exchange increases with the square root of time.

Theoretically, it would be desirable to employ a temperature as high as possible, without encountering crystal melting, in order to minimize time. As a practical matter, however, the ion exchange temperature is usually determined by the availability of suitable molten salt materials, or other ion exchange media; also, by the tendency of such molten materials to chemically attack both the glass-ceramic and the treating equipment at an accelerated rate as temperature increases. These practical considerations generally limit the treating temperature to around 800° C. or below and require times on the order of 4–16 hours for a useful degree of strengthening.

Chloride salts commonly tend to be highly corrosive of glass and glass-ceramic surfaces, especially at very elevated temperatures. Nevertheless, I have learned that a mixture of the chloride and sulfate salts of potassium is particularly effective for present purposes. This mixture forms a eutectic at about 52% by weight KCl and 48% by weight $K_2SO_4$ that melts at about 690° C. Salt bath compositions may generally be varied over a range of about 50–60% KCl and 40–50% $K_2SO_4$ depending upon the particular temperature of operation, but the indicated eutectic mixture is obviously the most flexible for general use.

By way of further illustrating, but not limiting my invention, a detailed description of its practice in conjunction with a specific embodiment is set forth.

A glass batch was produced by mixing sand, alumina and soda in proportions based on the following glass composition, formulated in weight percent on an oxide basis: 45% $SiO_2$, 40% $Al_2O_3$ and 15% $Na_2O$. The batch was melted at 1800° C. for 4 hours to produce a homogeneous melt from which slabs were cast and cut into $5/16''$ x $1/4''$ x $5''$ rectangular bars for strengthening evaluation purposes.

These test samples were converted to a glass-ceramic state characterized by a carnegieite crystal phase by heat treating in accordance with the following schedule:

Heat at 300°/hour to 850° C.
Hold for 4 hours at 850° C.
Heat at 300°/hour to 1100° C.
Hold for 4 hours at 1100° C.
Cool at furnace rate.

The structure of the crystallized bar samples was examined via X-ray diffraction analysis along with transmission and replica electron microscopy. The bars were demonstrated to be about 75% by weight crystalline, comprising about 15% mullite with the remainder being essentially all carnegieite.

As was observed above, the very high percentage of crystallinity inherent in the glass-ceramic articles of this invention leaves a residual glassy matrix which is small in amount and having a composition quite dissimilar to the original glass, inasmuch as the crystal constituents have been precipitated therefrom. Hence, in the preferred embodiment of the invention, substantially all of the alkali metal ions will be part of the carnegieite crystal structure and any other crystal phases which may be present, resulting in a highly siliceous residual glassy matrix. Some alkali metal ions in excess of those incorporated in the crystal phases can be tolerated, however, but amounts greater than about 5% by weight in excess hazard the production of a coarse-grained rather than the desired fine-grained glass-ceramic article. These "contaminant" ions in the residual glassy matrix can also, of course, be exchanged with the potassium ions during the subsequent ion exchange reaction but, since the total glass content of the articles is very small and the number of such ions in the glassy phase is also very small, the effect of any such exchange upon the properties of the article would be virtually negligible when compared to the effect resulting from the exchange occurring in the carnegieite crystals.

A set of the glass-ceramic test bars thus produced was then immersed in a molten salt bath composed of 52% KCl and 48% $K_2SO_4$, the proportions being by weight. After eight hours immersion in this bath at a temperature of 775° C. the test bars were removed, cleaned, and subjected to a severe abrasion treatment prior to strength measurement.

The abrasion treatment consisted in mixing the set of test bar samples with 200 cc. of 30 grit silicon carbide particles and subjecting the mixture to a tumbling motion for 15 minutes in a Number 0 ball mill jar rotating at 90–100 r.p.m. Each abraded bar was then mounted on spaced knife edges in a Tinius Olsen testing machine and a continuously increasing load applied opposite to and intermediate of the supports until the bar broke in flexure. From the measured load required to break each bar, a modulus of rupture (MOR) value was calculated for the individual bar and an average value determined for each set of samples.

This calculated value is taken as the tumble abraded strength of the material. It was thus determined that the ion exchanged test samples had an average tumble abraded MOR of 32,700 p.s.i. By way of comparison, untreated glass-ceramic test bars which were similarly abraded were determined to have an abraded MOR of 17,000 p.s.i.

Since the strength of these treated glass-ceramic articles is dependent upon the surface compression layer introduced therein through the ion exchange reaction and because essentially all service applications for these articles will contemplate some surface injury thereto even if it be only such suffered in conventional handling and shipping, the permanent or practical improvement in strength exhibited by these articles is that which is maintained after substantial surface abrasion. Therefore, the above-described tumble abrasion test is one which was initially developed by the glass industry to simulate the surface abuse which a glass article can experience in actual service and is believed to be equally appropriate with glass-ceramic articles. Preferably, the depth of the surface layer imparted by the ion exchange process is at least 0.001" to insure a high abraded strength in the article. This depth of layer can be observed quite readily through electron microscope examination of a cross-section of the article.

From the above data, it will be seen that the invention provides carnegieite glass-ceramic articles having a substantially increased tumble abraded strength and a means of producing such strengthened articles. While some experimentation would be necessary to determine optimum treating conditions for a given composition, the above data are exemplary of satisfactory ceraming and ion exchange strengthening schedules for this type of glass-ceramic material generally.

Further, while the recited examples employed a bath of molten potassium salt and this is the preferred manner for undertaking the ion exchange process, it will be understood that other sources of exchangeable potassium ions can be utilized which are operable at the temperatures required in this invention. Thus, for example, pastes and vapors are well-known exchange media in the staining arts involving ion exchange. Finally, whereas the most rapid rates of exchange and the highest strengths will normally be achieved where pure potassium ion-containing materials comprise the exchange source, minor contamination thereof can be tolerated. It is believed, however, that the determination of the maximum amount of contamination that can be tolerated in the ion exchange medium is well within the technical ingenuity of a person of ordinary skill in the art.

In the discussion above, my invention has been described as being based upon the replacement of sodium ions in carnegieite by potassium ions but wherein the structural nature of the crystals is essentially unchanged thereby. Hence, at least part of the sodium ions in the carnegieite is replaced by potassium ions but this "crowding" of the larger potassium ions into sites within the crystals previously occupied by the smaller sodium ions does not destroy the basic structure of carnegieite. That such an exchange does indeed occur, nevertheless, is demonstrated through an X-ray diffraction analysis of the surface crystals before and after the ion exchange process. This exchange of sodium ions for potassium ions is recorded in the following table which reports several of the d-spacings and the intensities observed thereat in an X-ray diffraction pattern made of the surface crystallization of a glass-ceramic bar prior to and after ion exchange. Then intensities are arbitrarily designated as very strong (v.s.), strong (s.), moderate (m.), and weak (w.).

| Before exchange | | 52% KCl–48% K$_2$SO$_4$, 8 hours at 775° C. | |
|---|---|---|---|
| d | I | d | I |
| 5.44 | w.[1] | | |
| 4.21 | v.s. | 4.29 | v.s. |
| 3.65 | m. | | |
| 3.43 | m.[1] | 3.43 | w.[1] |
| 3.05 | m. | 3.10 | m. |
| 2.90 | w. | | |
| 2.72 | w.[1] | 2.68 | w.[1] |
| 2.58 | s. | 2.56 | w. |
| 2.21 | w.[1] | | |
| 2.19 | m. | 2.25 | v.s. |

[1]Mullite.

It is believed that this table clearly illustrates that the fundamental crystal structure of the carnegieite is maintained during the ion exchange process. However, since the peaks in the diffraction pattern which are characteristic of the carnegieite crystals before the ion exchange are essentially retained after the exchange but their spacing and intensity vary slightly, distortion of the crystal cell but not the destruction thereof is reflected therein. Hence, this distortion of the crystal cell demonstrates the production of a carnegieite-type crystal wherein larger potassium ions have crowded into the structure thereof to replace the original sodium ions.

Finally, inasmuch as there are essentially no sodium ions in the residual glassy matrix, the integral surface compression layer formed in the glass-ceramic article must have been the result of ion exchange occurring within the carnegieite crystals of this surface layer. While, as has been illustrated above, carnegieite is the predominant crystal phase developed within the glass-ceramic article, minor amounts of other crystals such as mullite can also be present. Nevertheless, since the occurrence of such extraneous crystals can dilute the maximum strengthening effect which can be attained where carnegieite is the only crystal phase, it is preferred to limit the sum of all such incidental crystallization to less than about 20% of the total crystallization.

I claim:
1. A unitary glass-ceramic article of high strength with an integral surface compressive stress layer and an interior portion and having a crystal content of at least 70% by weight of the article, wherein the crystals of said interior portion consist essentially of carnegieite and the crystals of said surface compressive stress layer consist essentially of carnegieite, the structural nature of said latter carnegieite crystals being essentially unchanged but in at least a portion of which the molar concentration of sodium ions is less with a corresponding increase in the molar concentration of potassium ions.

2. A glass-ceramic article according to claim 1 wherein said interior portion consists essentially, by weight on the oxide basis, of about 12–19% Na$_2$O, 37–45% Al$_2$O$_3$, and 40–51% SiO$_2$.

3. A method for making a unitary glass-ceramic article of high strength wherein the crystal content thereof constitutes at least 70% by weight of the article and having an integral surface compressive stress layer and an interior portion which comprises contacting a glass-ceramic article consisting essentially of Na$_2$O, Al$_2$O$_3$, SiO$_2$, TiO$_2$ and/or ZrO$_2$ and consisting essentially of carnegieite as the crystal phase at a temperature between about 700°–800° C. with a source of exchangeable potassium ions for a period of time sufficient to replace at least part of the sodium ions of said carnegieite in a surface layer of the article with potassium ions, such replacement not changing the essential structural nature of the carnegieite crystals but effecting an integral compressively stressed surface layer on the article.

4. A method according to claim 3 wherein said interior portion consists essentially, by weight on the oxide basis, of about 12–19% Na$_2$O, 37–45% Al$_2$O$_3$, and 40–51% SiO$_2$.

5. A method according to claim 3 wherein said time sufficient to replace at least part of the sodium ions of said carnegieite in a surface layer of the article with potassium ions ranges between about 4–16 hours.

References Cited

UNITED STATES PATENTS

| 2,779,136 | 1/1957 | Hood et al. | 65—30X |
| 3,218,220 | 11/1965 | Weber | 65—30X |
| 3,282,770 | 11/1966 | Stookey et al. | 65—30X |
| 3,482,513 | 2/1966 | Denman | 65—33X |

FOREIGN PATENTS

Kistler, S. S.: "Stresses in Glass Produced by Non-Uniform Exchange of Monovalent Ion," U. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—30, 33

UNITED STATES PATENT OFFICE
CERTIFICATE OF CORRECTION

Patent No. 3,586,521   Dated June 22, 1971

Inventor(s) David A. Duke

It is certified that error appears in the above-identified patent and that said Letters Patent are hereby corrected as shown below:

Column 1, line 4, insert -- assignor to Corning Glass Works, Corning, N. Y. --.

Signed and sealed this 7th day of March 1972.

(SEAL)
Attest:

EDWARD M.FLETCHER,JR.        ROBERT GOTTSCHALK
Attesting Officer            Commissioner of Patents